US012565863B2

(12) United States Patent (10) Patent No.: US 12,565,863 B2
Manabe et al. (45) Date of Patent: Mar. 3, 2026

(54) TORQUE ESTIMATION APPARATUS FOR INTERNAL COMBUSTION ENGINE

(71) Applicant: Mitsubishi Electric Corporation, Tokyo (JP)

(72) Inventors: Hiroki Manabe, Tokyo (JP); Kazuhiro Nishiwaki, Tokyo (JP); Taiga Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/871,633

(22) PCT Filed: Jun. 16, 2022

(86) PCT No.: PCT/JP2022/024115
§ 371 (c)(1),
(2) Date: Dec. 4, 2024

(87) PCT Pub. No.: WO2023/243035
PCT Pub. Date: Dec. 21, 2023

(65) Prior Publication Data
US 2025/0361841 A1 Nov. 27, 2025

(51) Int. Cl.
G01M 15/05 (2006.01)
F02D 41/00 (2006.01)
(52) U.S. Cl.
CPC ......... F02D 41/0097 (2013.01); G01M 15/05 (2013.01); *F02D 2200/101* (2013.01)
(58) Field of Classification Search
CPC .. F02D 41/0097; F02D 41/26; F02D 2200/10; F02D 2200/101; F02D 2250/18
See application file for complete search history.

(56) References Cited

U.S. PATENT DOCUMENTS 6,167,342 A * 12/2000 Itoyama ................ F02D 41/145
701/104
6,237,563 B1 5/2001 Froehlich et al.
(Continued)

FOREIGN PATENT DOCUMENTS

DE 197 33 106 A1 2/1999
DE 103 05 092 A1 8/2004
(Continued)

OTHER PUBLICATIONS

International Search Report for International Application No. PCT/JP2022/024115 dated Sep. 6, 2022.
(Continued)

*Primary Examiner* — Grant Moubry
(74) *Attorney, Agent, or Firm* — Sughrue Mion, PLLC

(57) ABSTRACT

To provide a torque estimation apparatus for an internal combustion engine which can learn the variation in the output torque of the internal combustion engine caused by the individual difference and the aging change of the internal combustion engine with good accuracy. A torque estimation apparatus for an internal combustion engine calculates a first estimation torque using a torque characteristic data for first estimation torque; calculates a second estimation torque based on an angular acceleration; learns a deviation between the second estimation torque and a preliminarily set reference value of the second estimation torque, as error learning value; and calculates a value obtained by correcting the first estimation torque by the error learning value, as the third estimation torque.

8 Claims, 9 Drawing Sheets

(56) References Cited

U.S. PATENT DOCUMENTS

| 6,866,024 B2 * | 3/2005 | Rizzoni ................ F02D 35/024 |
| | | 123/430 |
| 9,002,550 B2 * | 4/2015 | Brennan .............. B60W 20/00 |
| | | 701/99 |
| 9,103,296 B2 * | 8/2015 | Nakamura ............ F02D 41/123 |
| 11,473,517 B1 * | 10/2022 | Matsushima ........... F02P 5/153 |
| 2017/0363510 A1 | 12/2017 | Varoquie et al. |
| 2020/0217259 A1 * | 7/2020 | Ogawa ................ F02D 41/0085 |

FOREIGN PATENT DOCUMENTS

| DE | 10 2015 102 249 A1 | 8/2016 |
| JP | 2005-291174 A | 10/2005 |

OTHER PUBLICATIONS

Extended European Search Report dated Jul. 10, 2025 from the European Patent Office in Application No. 22946852.5.

* cited by examiner

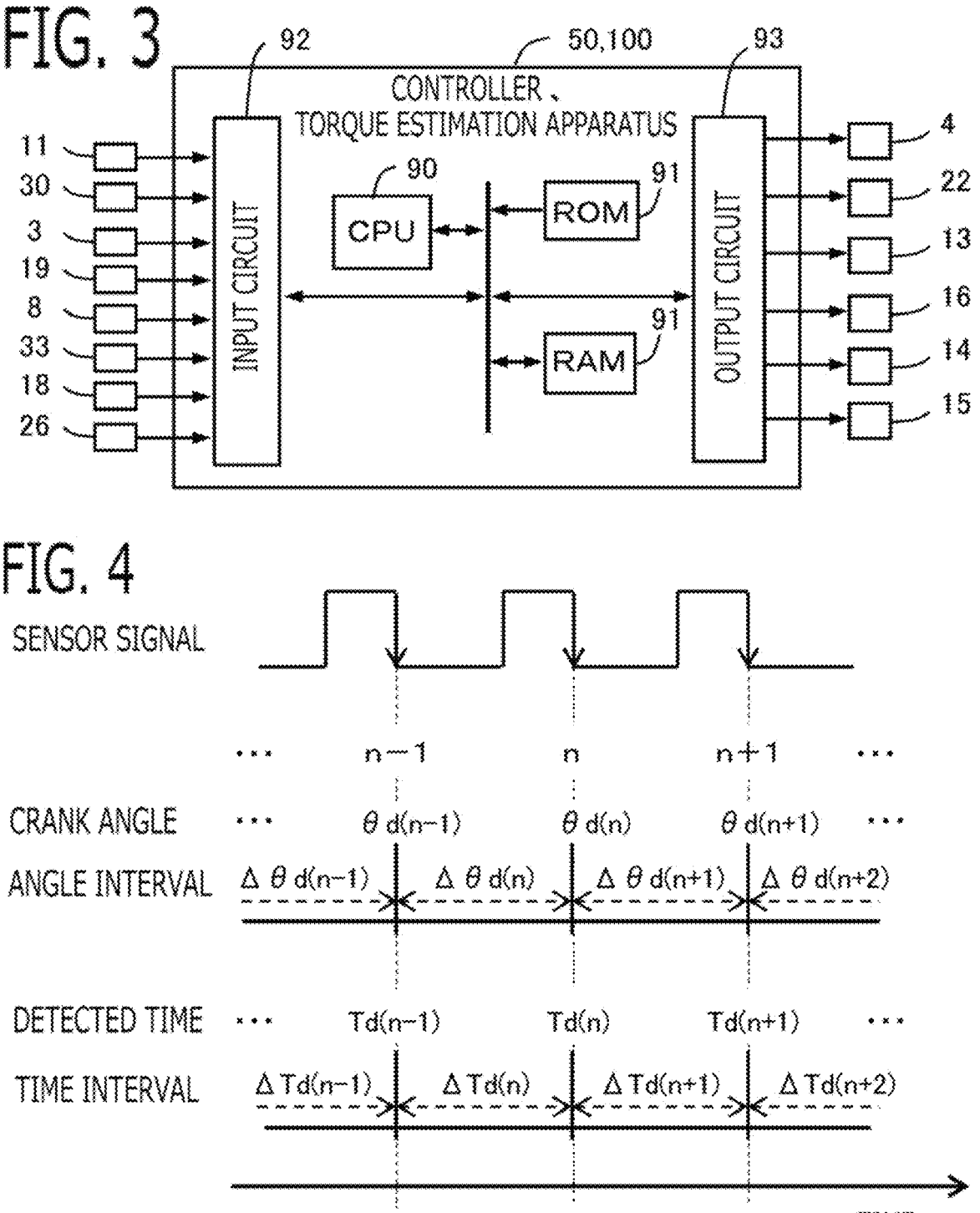

CONTROLLER、
TORQUE ESTIMATION APPARATUS

90

CPU

91

ROM

91

RAM

INPUT CIRCUIT

OUTPUT CIRCUIT 11
30
3
19
8
33
18
26

SENSOR SIGNAL

· · ·　n−1　　n　　n+1　· · ·

CRANK ANGLE　· · ·　$\theta d(n-1)$　$\theta d(n)$　$\theta d(n+1)$　· · ·

ANGLE INTERVAL　$\Delta\theta d(n-1)$　$\Delta\theta d(n)$　$\Delta\theta d(n+1)$　$\Delta\theta d(n+2)$ DETECTED TIME　· · ·　$Td(n-1)$　$Td(n)$　$Td(n+1)$　· · ·

TIME INTERVAL　$\Delta Td(n-1)$　$\Delta Td(n)$　$\Delta Td(n+1)$　$\Delta Td(n+2)$

TIME

FIG. 5

| | | | | |
|---|---|---|---|---|
| FIRST CYLINDER | COMPRESSION | COMBUSTION | EXHAUST | INTAKE | COMPRESSION |
| SECOND CYLINDER | INTAKE | COMPRESSION | COMBUSTION | EXHAUST | INTAKE |
| THIRD CYLINDER | COMBUSTION | EXHAUST | INTAKE | COMPRESSION | COMBUSTION |
| FOURTH CYLINDER | EXHAUST | INTAKE | COMPRESSION | COMBUSTION | EXHAUST |

SENSOR SIGNAL

360 DEGREES          360 DEGREES

FIG. 8

TORQUE ESTIMATION APPARATUS FOR INTERNAL COMBUSTION ENGINE

This is a National Stage Application of International Application No. PCT/JP2022/024115 filed Jun. 16, 2022.

TECHNICAL FIELD

The present disclosure relates to a torque estimation apparatus for an internal combustion engine.

BACKGROUND ART

The technology of patent document 1 estimates the output torque of the internal combustion engine, using the torque characteristic of the internal combustion engine, based on the operating state affecting the output torque, such as the throttle opening degree, the intake air amount, and the fuel injection amount. The technology of patent document 1 estimates the output torque of the internal combustion engine, based on the characteristic of the torque converter, and learns the torque estimation error.

CITATION LIST

Patent Literature

Patent document 1: JP 2005-291174 A

SUMMARY OF INVENTION

Technical Problem

The technology of patent document 1 learns the variation in the output torque caused by the individual difference and the aging change of the internal combustion engine, by utilizing the characteristic of the torque converter which is an apparatus external to the internal combustion engine. However, there is variation also in the characteristic of the torque converter, and the operating region in which the learning is possible is limited.

Then, the purpose of the present disclosure is to provide a torque estimation apparatus for an internal combustion engine which can learn the variation in the output torque of the internal combustion engine caused by the individual difference and the aging change of the internal combustion engine with good accuracy.

Solution to Problem

A torque estimation apparatus for an internal combustion engine according to present disclosure, including:

a rotation information detection unit that detects a rotational speed and an angular acceleration of a crankshaft of the internal combustion engine;

a first estimation torque calculation unit that, by using a torque characteristic data for first estimation torque in which a relation between an operating state for torque characteristic data which includes at least one or more of a throttle opening degree, a cylinder internal intake air amount, a fuel injection amount, and a rotational speed, and a first estimation torque as an output torque of the internal combustion engine is preliminarily set, calculates the first estimation torque corresponding to the present operating state for torque characteristic data;

a second estimation torque calculation unit that calculates a second estimation torque which is an estimated torque of the crankshaft, based on the angular acceleration; and a third estimation torque calculation unit that learns a deviation between the second estimation torque and a preliminarily set reference value of second estimation torque, as an error learning value, and calculates a value obtained by correcting the first estimation torque with the error learning value, as a third estimation torque.

Advantage of Invention

According to the torque estimation apparatus for the internal combustion engine of the present disclosure, by comparing the second estimation torque calculated based on the actually detected angular acceleration with the reference value of second estimation torque, a torque variation caused by the individual variation, the aging change, or the like of the internal combustion engine can be learned as the error learning value. Then, by calculating the third estimation torque by correcting the first estimation torque calculated by the error learning value based on the preliminarily set torque characteristic data of reference state, the accurate torque estimation value in which the torque variation caused by the individual variation, the aging change, or the like of the internal combustion engine was reflected can be calculated.

BRIEF DESCRIPTION OF THE DRAWINGS

FIG. 3 is a hardware configuration figure of the torque estimation apparatus (controller) according to Embodiment 1;

FIG. 4 is a time chart explaining the processing of the rotation information detection unit according to Embodiment 1;

FIG. 5 is a figure explaining the relation between each cylinder and each stroke according to Embodiment 1;

FIG. 8 is a figure explaining the torque characteristic data for reference value according to Embodiment 1;

DETAILED DESCRIPTION OF THE EMBODIMENTS

1. Embodiment 1

Figure 1:
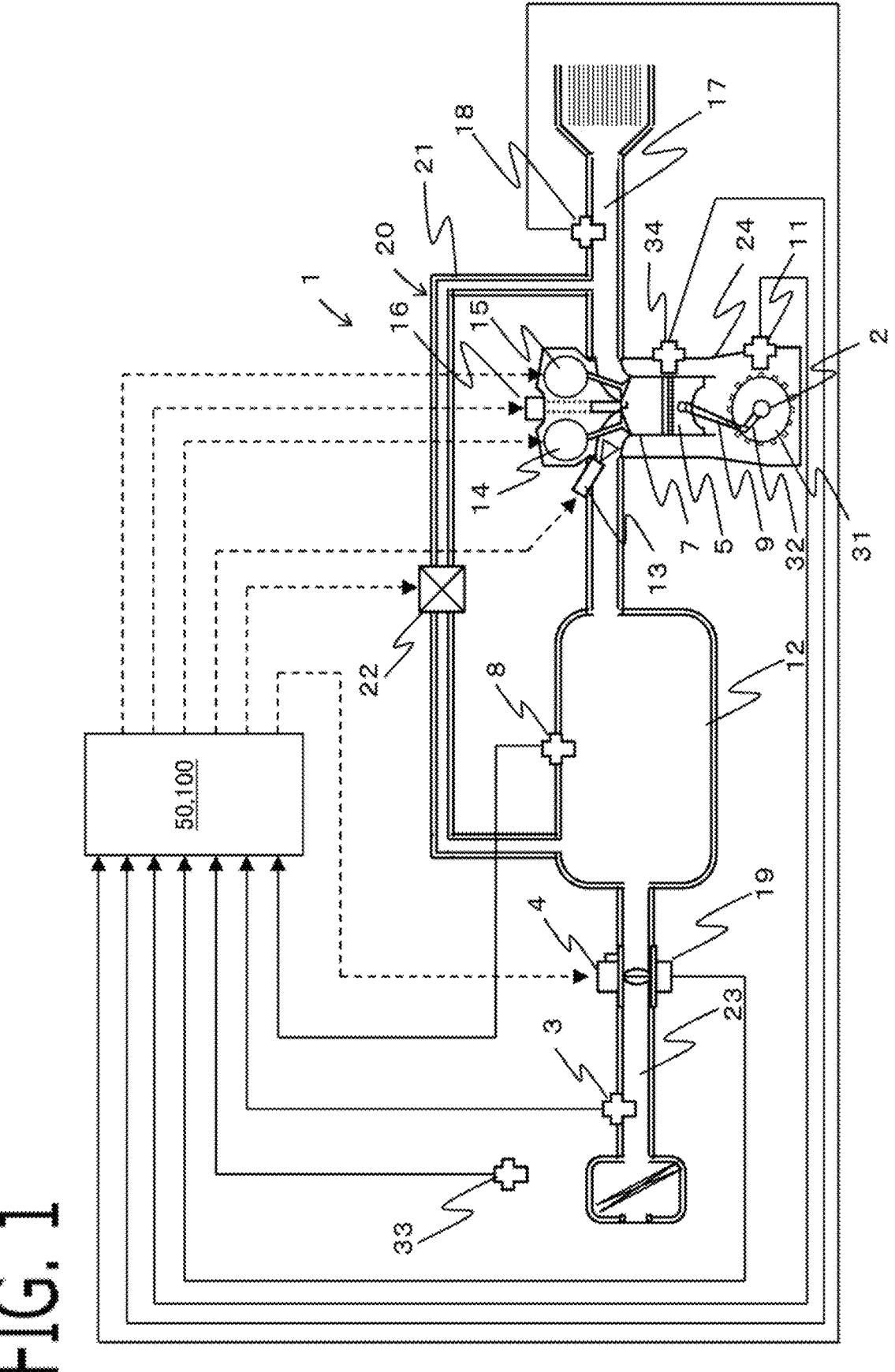
FIG. 1 is a schematic configuration diagram of the internal combustion engine and the torque estimation apparatus (the controller) according to Embodiment 1.
Figure 2:
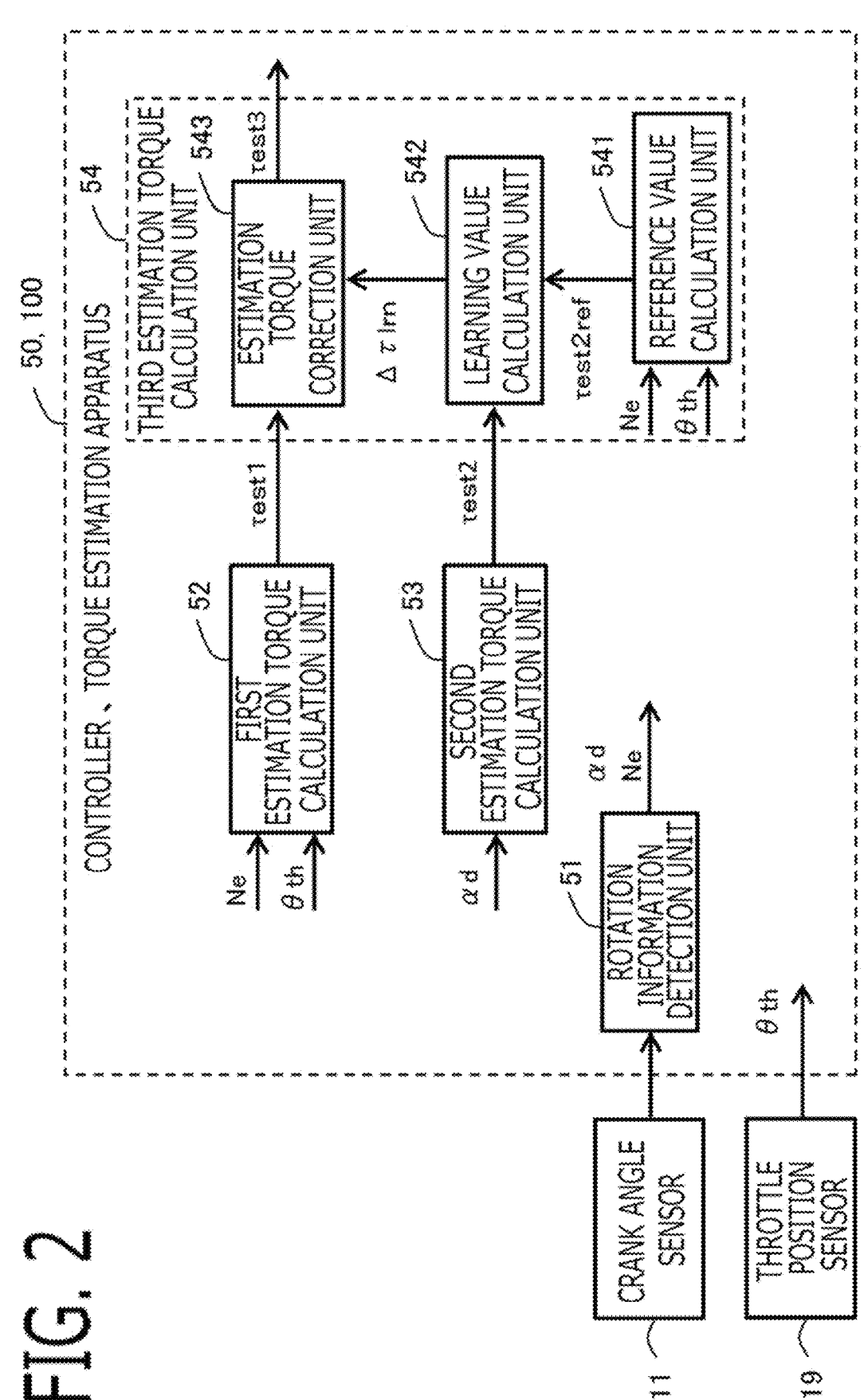
FIG. 2 is a block diagram of the torque estimation apparatus (controller) according to Embodiment 1.

A torque estimation apparatus for an internal combustion engine 100 (hereinafter, referred to simply as the torque estimation apparatus 100) according to Embodiment 1 will be explained with reference to drawings. FIG. 1 is a schematic configuration diagram of the internal combustion engine 1 and the torque estimation apparatus 100 according to the present embodiment. FIG. 2 is a block diagram of the torque estimation apparatus 100 according to the present embodiment. In the present embodiment, the torque estimation apparatus 100 is embedded into a controller for the internal combustion engine 50. The torque estimation apparatus 100 may be separate from the controller for the internal combustion engine 50.

1-1. Configuration of Internal Combustion Engine 1

The configuration of the internal combustion engine 1 will be explained. As shown in FIG. 1, the internal combustion engine 1 is provided with a combustion chamber 7 (hereinafter, referred to also as a cylinder 7) in which a fuel-air mixture is combusted. The internal combustion engine 1 is provided with an intake pipe 23 for supplying air to the combustion chamber 7 and an exhaust pipe 17 for discharging exhaust gas from the combustion chamber 7. The internal combustion engine 1 is a gasoline engine. The internal combustion engine 1 is provided with a throttle valve 4 which opens and closes intake pipe 23. The throttle valve 4 is an electronically controlled throttle valve which is opening/closing-driven by an electric motor controlled by controller 50. A throttle position sensor 19 which outputs an electric signal according to the opening degree of the throttle valve 4 is provided in the throttle valve 4.

An air flow sensor 3 which outputs an electric signal according to an intake air amount taken into the intake pipe 23 is provided in the intake pipe 23 on the upstream side of throttle valve 4. The internal combustion engine 1 is provided with an exhaust gas recirculation apparatus 20. The exhaust gas recirculation apparatus 20 is provided with an EGR passage 21 which recirculates the exhaust gas from the exhaust pipe 17 to the intake manifold 12, and an EGR valve 22 which opens and closes the EGR passage 21. The intake manifold 12 is a part of the intake pipe 23 on the downstream side of the throttle valve 4. The EGR valve 22 is an electronic controlled EGR valve which is opening/closing-driven by an electric motor controlled by controller 50. An air-fuel ratio sensor 18 which outputs an electric signal according to an air-fuel ratio of exhaust gas in the exhaust pipe 17 is provided in the exhaust pipe 17.

A gas pressure sensor 8 which outputs an electric signal according to a pressure in the intake manifold 12 is provided in the intake manifold 12. An injector 13 for injecting a fuel is provided on the downstream side part of the intake manifold 12. The injector 13 may be provided so as to inject a fuel directly into the cylinder 7. An atmospheric pressure sensor 33 which outputs an electric signal according to an atmospheric pressure is provided in the internal combustion engine 1. A water temperature sensor 34 which detects a cooling water temperature is provided in the internal combustion engine 1.

An ignition plug for igniting a fuel-air mixture and an ignition coil 16 for supplying ignition energy to the ignition plug are provided on the top of the combustion chamber 7. At the top of the combustion chamber 7, an intake valve 14 for adjusting an intake air amount to be taken from the intake pipe 23 into the combustion chamber 7 and an exhaust valve 15 for adjusting an exhaust gas amount to be exhausted from the combustion chamber 7 to the exhaust pipe 17 are provided. The intake valve 14 is provided with an intake variable valve timing mechanism for varying the opening and closing timing thereof. The exhaust valve 15 is provided with an exhaust variable valve timing mechanism for varying the opening and closing timing thereof. Each of the variable valve timing mechanisms 14, 15 is provided with an electric actuator.

The internal combustion engine 1 is provided with a plurality of combustion chambers 7 (in this example, four). A piston 5 is provided in each combustion chamber 7. The piston 5 of each combustion chamber 7 is connected to a crankshaft 2 via a connecting rod 9 and a crank 32. The crankshaft 2 is rotated by the reciprocating movement of the piston 5. A combustion gas pressure generated in each combustion chamber 7 presses the top face of the piston 5, and rotates the crankshaft 2 via the connecting rod 9 and the crank 32. The crankshaft 2 is connected with a power transfer mechanism which transmits driving force to a wheel, a generator and the like. The power transfer mechanism is composed of a transmission and the like.

The internal combustion engine 1 is provided with a rotor 31 which rotates integrally with the crankshaft 2. A plurality of teeth are provided in the rotor 31 at a plurality of preliminarily set crank angles. In the present embodiment, the teeth of the rotor 31 are arranged at intervals of 20 degrees. The teeth of the rotor 31 are provided with a chipped tooth part where a part of teeth is chipped. The internal combustion engine 1 is provided with a crank angle sensor 11 which is fixed to an engine block 24 and detects the tooth of the rotor 31.

The internal combustion engine 1 is provided with a cam shaft connected with the crankshaft via a chain. The cam shaft opens and closes the intake valve 14 and the exhaust valve 15. During the crankshaft 2 rotates two times, the cam shaft rotates once. The internal combustion engine 1 is provided with a rotor for cam which rotates integrally with the cam shaft. A plurality of teeth are provided in the rotor for cam at a plurality of preliminarily set cam shaft angles. The internal combustion engine 1 is provided with a cam angle sensor 30 which is fixed to the engine block 24 and detects the tooth of the rotor for cam (refer to FIG. 3).

Based on two kinds of output signals of the crank angle sensor 11 and the cam angle sensor 30, the controller 50 detects the crank angle on the basis of the top dead center (TDC) of each piston 5 and determines the stroke of each combustion chamber 7. The internal combustion engine 1 is a 4-stroke engine which has an intake stroke, a compression stroke, a combustion stroke, and an exhaust stroke.

Each of the crank angle sensor 11 and the cam angle sensor 30 outputs an electric signal according to change of the distance between each sensor and tooth by rotation of the crankshaft 2. The output signal of each angle sensor 11, 30 becomes a rectangular wave that a signal turns on or off when the distance between sensor and tooth is near or when the distance is far. An electromagnetic pickup type sensor is used for each angle sensor 11, 30, for example.

The configuration of the internal combustion engine may not be limited to the configuration explained using FIG. 1, but various kinds of internal combustion engines may be used.

1-2. Configuration of Torque Estimation Apparatus 100 (Controller 50)

Next, the torque estimation apparatus 100 will be explained. The torque estimation apparatus 100 is embedded into the controller 50 for the internal combustion engine. As shown in FIG. 2, the controller 50 is provided with processing units, such as a rotation information detection unit 51, a first estimation torque calculation unit 52, a second estimation torque calculation unit 53, and a third estimation torque calculation unit 54. The respective processing units 51 to 54 of the controller 50 are realized by processing circuits provided in the controller 50. Specifically, as shown in FIG. 3, the controller 50 is provided with, as a processing circuit, an arithmetic processor (computer) 90 such as a CPU (Central Processing Unit), storage apparatuses 91 connected to the arithmetic processor 90 via a bus or other line, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches and is provided with an A/D converter and the like for inputting output signals from the sensors and the switches to the arithmetic processor 90. The output circuit 93 is connected with electric loads and is provided with a driving circuit and the like for outputting a control signal from the arithmetic processor 90.

Then, the arithmetic processor 90 runs software items (programs) stored in the storage apparatus 91 such as ROM and EEPROM, and collaborates with other hardware devices in the controller 50, such as the storage apparatus 91, the input circuit 92, and the output circuit 93, so that the respective functions of the processing units 51 to 54 provided in the controller 50 are realized. Setting data, such as the torque characteristic data for first estimation torque, the inertia moment Icrk, the load torque τload, and the torque characteristic data for reference value, used by the processing units 51 to 54 are stored in the storage apparatus 91, such as ROM and EEPROM. Data of each calculation value and each detection value, such as the rotational speed Ne, the angular speed ωd, the angular acceleration αd, the first estimation torque τest1, the maximum value of angular acceleration αmax, the second estimation torque τest2, and the error learning value Δτlrn, calculated by the processing units 51 to 54 is stored in the rewritable storage apparatus 91 such as RAM.

In the present embodiment, the input circuit 92 is connected with the crank angle sensor 11, the cam angle sensor 30, the water temperature sensor 34, the air flow sensor 3, the throttle position sensor 19, the gas pressure sensor 8, the atmospheric pressure sensor 33, the air fuel ratio sensor 18, an accelerator position sensor 26, and the like. The output circuit 93 is connected with the throttle valve 4 (electric motor), the EGR valve 22 (electric motor), the injector 13, the ignition coil 16, the intake-air variable valve timing mechanism 14, the exhaust-gas variable valve timing mechanism 15, and the like. The torque estimation apparatus 100 is connected with various kinds of unillustrated sensors, switches, actuators, and the like. The controller 50 detects operating states of the internal combustion engine 1, such as a throttle opening degree θth, a cylinder internal intake air amount, a pressure in the intake manifold, an atmospheric pressure, and an air-fuel ratio, based on the output signals of various sensors.

As a basic control, the controller 50 calculates a fuel injection amount, an ignition timing, and the like, based on the inputted output signals and the like from the various kinds of sensors, and then drives and controls the injector 13, the ignition coil 16, and the like. Based on the output signal of the accelerator position sensor 26 and the like, the controller 50 calculates an output torque of the internal combustion engine 1 demanded by the driver, and then controls the throttle valve 4 and the like so that an intake air amount for realizing the demanded output torque is achieved. Specifically, the controller 50 calculates a target throttle opening degree and then drives and controls the electric motor of the throttle valve 4 so that the throttle opening degree θth which is detected based on the output signal of the throttle position sensor 19 approaches the target throttle opening degree. And, the controller 50 calculates a target opening degree of the EGR valve 22, based on the inputted output signals and the like from the various kinds of sensors, and then drives and controls the electric motor of the EGR valve 22. The controller 50 calculates a target opening and closing timing of the intake valve, and a target opening and closing timing of the exhaust valve, based on the output signals of the various sensors, and drives and controls the intake and the exhaust variable valve timing mechanisms 14, 15, based on each target opening and closing timing.

1-2-1. Rotation Information Detection Unit 51

The rotation information detection unit 51 detects a rotational speed Ne and an angular acceleration ad of the crankshaft of the internal combustion engine. In the present embodiment, the rotation information detection unit 51 detects a crank angle θd based on the output signal of the crank angle sensor 11, and calculates the angular speed wd which is a time change rate of the detected crank angle θd, and the angular acceleration αd which is a time change rate of the angular speed wd. The rotation information detection unit 51 detects the rotational speed Ne of the crankshaft, based on the output signal of the crank angle sensor 11. The rotational speed Ne corresponds to the angular speed od, but in the present embodiment, it is an average speed during the stroke period.

In the present embodiment, as shown in FIG. 4, the rotation information detection unit 51 detects the crank angle θd based on the output signal of the crank angle sensor 11, and detects a detection time Td when the crank angle θd is detected. Then, the rotation information detection unit 51 calculates an angle interval Δθd and a time interval ΔTd corresponding to the interval between the detected angles θd, based on the detected angle θd which is the detected crank angle θd, and the detection time Td.

For example, the rotation information detection unit 51 determines the crank angle θd when the falling edge (or rising edge) of the output signal (rectangular wave) of the crank angle sensor 11 is detected. The rotation information detection unit 51 detects the crank angle θd on the basis of the top dead center (TDC) of the piston of the first cylinder, and determines the stroke of each cylinder 7, based on two kinds of output signals of the crank angle sensor 11 and the cam angle sensor 30, using a well-known method. FIG. 5 shows strokes of the first cylinder to the fourth cylinder.

<Calculation of Angular Speed ωd and Angular Acceleration αd>

The rotation information detection unit 51 calculates the angular speed ωd, based on each crank angle θd, and the detection time Td when each crank angle θd is detected. For example, as shown in the next equation, the rotation information detection unit 51 calculates the angular speed ωd (n) at the present detected angle, based on the angle interval Δθd (n) between the crank angle θd (n) detected this time and the crank angle θd (n−1) detected the previous time, and the time interval $\Delta Td$ (n) between the present detection time Td (n) and the previous detection time Td (n−1). Various well-known methods other than this may be used for the calculation of the angular speed ωd.

[Math. 1]

$$\Delta\theta d(n) = \theta d(n) - \theta d(n-1) \tag{1}$$

$$\Delta Td(n) = Td(n) - Td(n-1)$$

$$\omega d(n) = \frac{\Delta\theta d(n)}{\Delta Td(n)}$$

The rotation information detection unit 51 calculates the angular acceleration od based on the angular speed ωd. For example, as shown in the next equation, the rotation information detection unit 51 calculates the angular acceleration at the present detected angle αd (n), based on the angular speed ωd (n) calculated at the present detected angle, the angular speed ωd (n−1) calculated at the previous detected angle, and the time interval $\Delta Td$ (n) at the present detected angle. Various well-known methods other than this may be used for the calculation of the angular acceleration od.

[Math. 2]

$$\alpha d(n) = \frac{\omega d(n) - \omega d(n-1)}{\Delta Td(n)} \tag{2}$$

1-2-2. First Estimation Torque Calculation Unit 52

By using a torque characteristic data for first estimation torque in which a relation between an operating state for torque characteristic data which includes at least one or more of the throttle opening degree θth, the cylinder internal intake air amount, the fuel injection amount, and the rotational speed Ne, and the first estimation torque τest1 as the output torque of the internal combustion engine is preliminarily set, the first estimation torque calculation unit 52 calculates the first estimation torque τest1 corresponding to the present operating state for torque characteristic data. The first estimation torque τest1 is a torque outputted to the outside of the internal combustion engine from the crankshaft, and is an average output torque during the stroke period.

Figure 6:
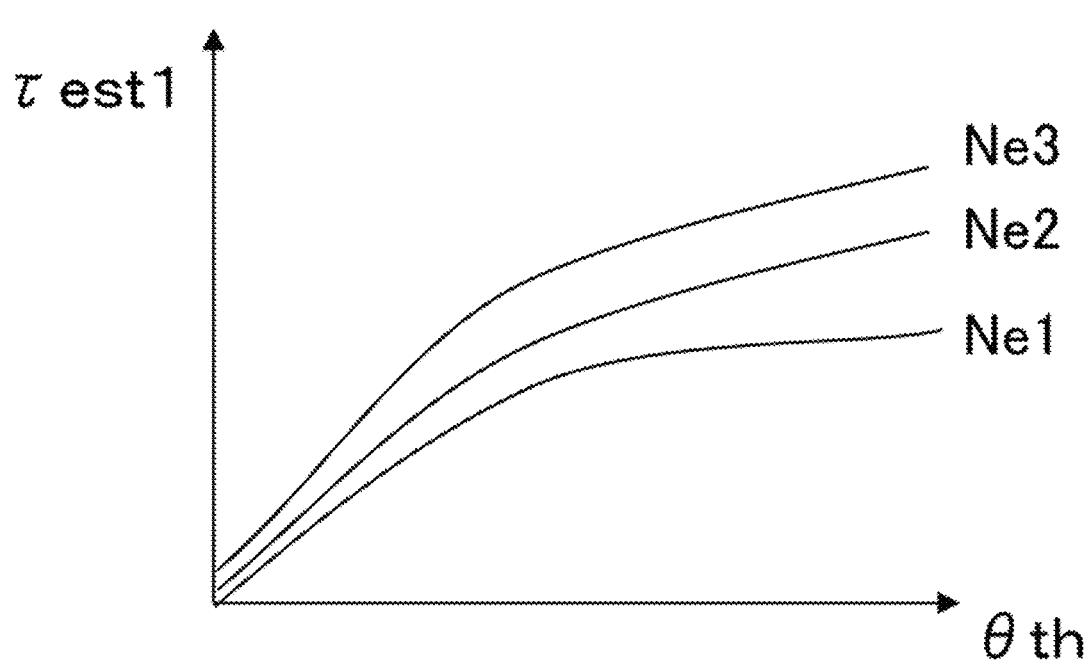
FIG. 6 is a figure explaining the torque characteristic data for first estimation torque according to Embodiment 1.

For example, a case where the throttle opening degree θth and the rotational speed Ne are used as the operating state for torque characteristic data will be explained. As shown in FIG. 6, the torque characteristic data for first estimation torque is map data in which a relation between the throttle opening degree θth, the rotational speed Ne, and the first estimation torque τest1 is preliminarily set. The first estimation torque calculation unit 52 calculates the first estimation torque τest1 corresponding to the present throttle opening degree θth and the present rotational speed Ne, by referring to the torque characteristic data for first estimation torque. Herein, instead of the throttle opening degree θth, the cylinder internal intake air amount or the fuel injection amount may be used. That is, as the operating state for torque characteristic data, parameters correlated with the rotational speed Ne and the fuel injection amount may be used.

As the operating state for torque characteristic data, various operating states of internal combustion engine correlated with the output torque, for example, the EGR rate, the ignition timing, the opening and closing timing of the intake valve, and the opening and closing timing of the exhaust valve may be used. As the torque characteristic data for first estimation torque, a plurality of map data may be combined, or a neural network and the like may be used.

1-2-3. Second Estimation Torque Calculation Unit 53

The second estimation torque calculation unit 53 calculates a second estimation torque τest2 which is an estimated torque of the crankshaft, based the angular acceleration ad.

Figure 7:
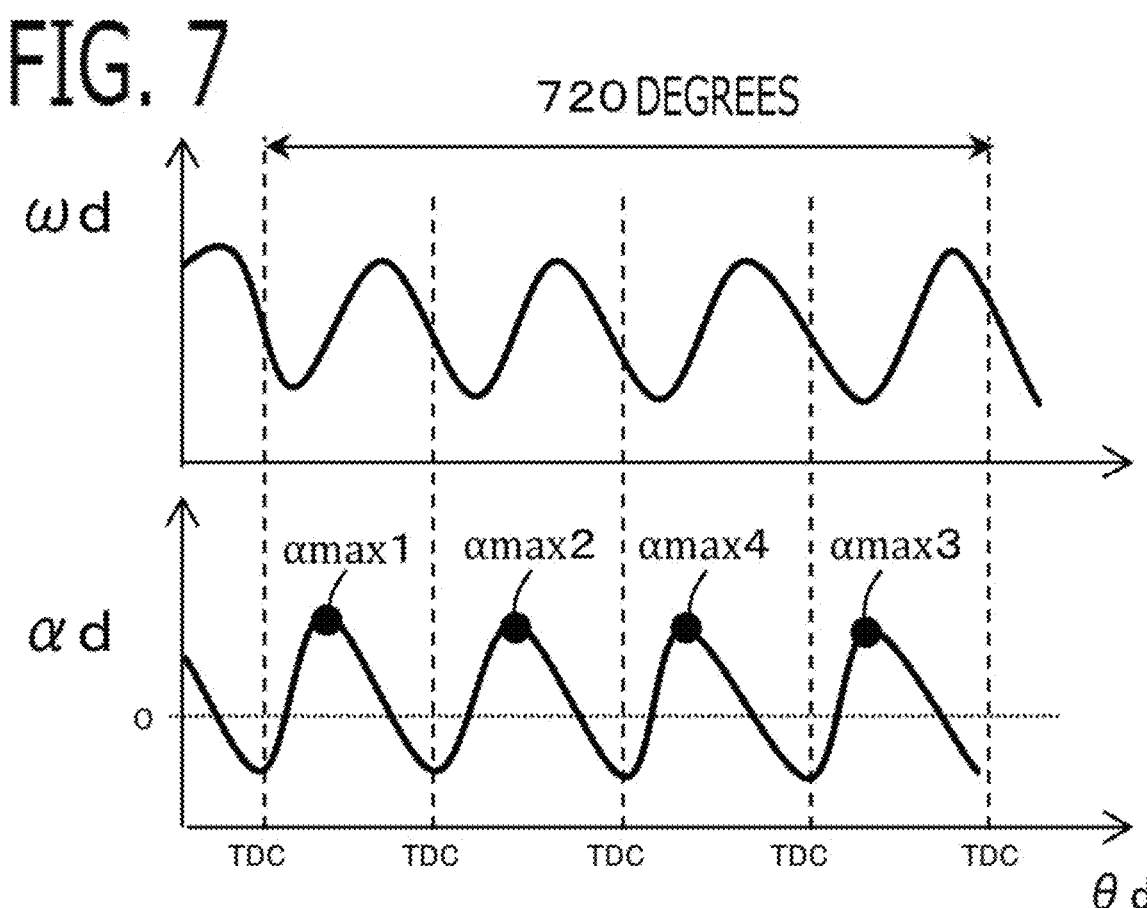
FIG. 7 is a figure explaining the calculation of the maximum value of the angular acceleration of each cylinder according to Embodiment 1.

In the present embodiment, as shown in FIG. 7, the second estimation torque calculation unit 53 calculates a maximum value αmax of the angular acceleration od during the combustion stroke, and calculates a second estimation torque τest2 based on the maximum value αmax of the angular acceleration. According to this configuration, by calculating the maximum value αmax of the angular acceleration during the combustion stroke, the second estimation torque τest2 can be calculated using the maximum value αmax of the angular acceleration increased by combustion, and the maximum value of the momentary torque which mainly increased by combustion can be calculated as the second estimation torque τest2.

In the present embodiment, the internal combustion engine 1 is provided with the four combustion chambers 7 (cylinder 7). The second estimation torque calculation unit 53 calculates the maximum values of the angular acceleration during the combustion stroke αmax1, αmax2, αmax3, and max4 for each of the four combustion chambers 7, and calculates the second estimation torque τest2 based on an average value αmaxave of the maximum values of the angular acceleration of the four combustion chambers, as shown in the next equation. The average value αmaxave is calculated whenever the crankshaft rotates two times.

[Math. 3]

$$\alpha_{maxave} = \frac{\alpha_{max1} + \alpha_{max2} + \alpha_{max3} + \alpha_{max4}}{4} \tag{3}$$

According to this configuration, even if there is variation in combustion torque between cylinders, the maximum value of the average momentary combustion torque among cylinders can be calculated.

The second estimation torque calculation unit 53 calculates the second estimation torque τest2 by multiplying the inertia moment Icrk to the angular acceleration od (in this example, the average value among cylinders αmaxave of the maximum value of angular acceleration). The inertia moment Icrk is a total value of the inertia moment of each rotation member which rotates integrally with the crankshaft, and is preliminarily set.

[Math. 4]

$$\tau_{est2} = \alpha_{maxave} \times Icrk - \tau_{load} \tag{4}$$

In the present embodiment, the second estimation torque calculation unit 53 calculates the second estimation torque τest2 by subtracting a load torque τload from a multiplication value of the angular acceleration od and the inertia moment Icrk. The load torque τload is various load torques applied to the crankshaft from the outside of the internal combustion engine, and is usually a negative value. For example, a preliminarily set value is used for the load torque τload. Alternatively, since the load torque τload does not usually vary largely during the stroke period, the second estimation torque calculation unit 53 may use a torque obtained by multiplying the angular acceleration od at an angle in the vicinity of the top dead center (TDC) of the piston to the inertia moment Icrk, as the load torque τload. The angle in the vicinity of the top dead center (TDC) may be set to an angle within a range from 10 degrees before the top dead center to 10 degrees after the top dead center, for example, TDC. In the vicinity of the top dead center, the connecting rod and the crank are aligned, and the shaft torque is not generated by the force of the cylinder pressure pushing the piston. Accordingly, the load torque τload can be calculated. According to this configuration, the load torque τload applied to the crankshaft from the outside of the internal combustion engine can be excluded, an increase amount of the momentary torque increased by combustion can be calculated, and the calculation accuracy of the second estimation torque τest2 can be improved.

An average angular acceleration during the stroke period may be used for the calculation of the second estimation torque τest2.

1-2-4. Third Estimation Torque Calculation Unit 54

The third estimation torque calculation unit 54 learns a deviation Δτest2 between the second estimation torque τest2 and a preliminarily set reference value of second estimation torque τest2ref, as an error learning value Δτlrn, and calculates a value obtained by correcting the first estimation torque τest1 by the error learning value Δτlrn, as a third estimation torque τest3.

According to this configuration, by comparing the second estimation torque τest2 calculated based on the actually detected angular acceleration od with the reference value of second estimation torque τest2ref, a torque variation caused by the individual variation, the aging change, or the like of the internal combustion engine 1 can be learned as the error learning value Δτlrn. Then, by correcting the first estimation torque τest1, which is calculated based on the preliminarily set torque characteristic data of reference state, with the error learning value Δτlrn, and calculating the third estimation torque τest3, the accurate torque estimation value in which the torque variation caused by the individual variation, the aging change, or the like of the internal combustion engine 1 was reflected can be calculated.

The controller 50 performs a torque control that controls the output torque of the internal combustion engine based on the third estimation torque τest3. For example, the controller 50 calculates the target throttle opening degree so that the third estimation torque τest3 approaches the demanded output torque. The controller 50 transmits the third estimation torque τest3 to an external controller, such as a vehicle control apparatus and a motor controller, and reflects it on a torque control of the external controller.

As shown in FIG. 2, the third estimation torque calculation unit 54 is provided with a reference value calculation unit 541, a learning value calculation unit 542, and an estimation torque correction unit 543.

<Reference Value Calculation Unit 541>

By using a torque characteristic data for reference value in which a relation between an operating state for reference value which includes at least one or more of the throttle opening degree θth, the cylinder internal intake air amount, the fuel injection amount, and the rotational speed Ne, and the reference value of second estimation torque τest2ref is preliminarily set, the reference value calculation unit 541 calculates the reference value of second estimation torque τest2ref corresponding to the present operating state for reference value.

In the present embodiment, since the reference value of second estimation torque τest2ref is the maximum value or the increase amount of the momentary torque increased by combustion, it is a value different from the first estimation torque τest1 which is the average output torque during the stroke period. Accordingly, in the torque characteristic data for reference value, a value different from the torque characteristic data for first estimation torque is set.

Figure 8:
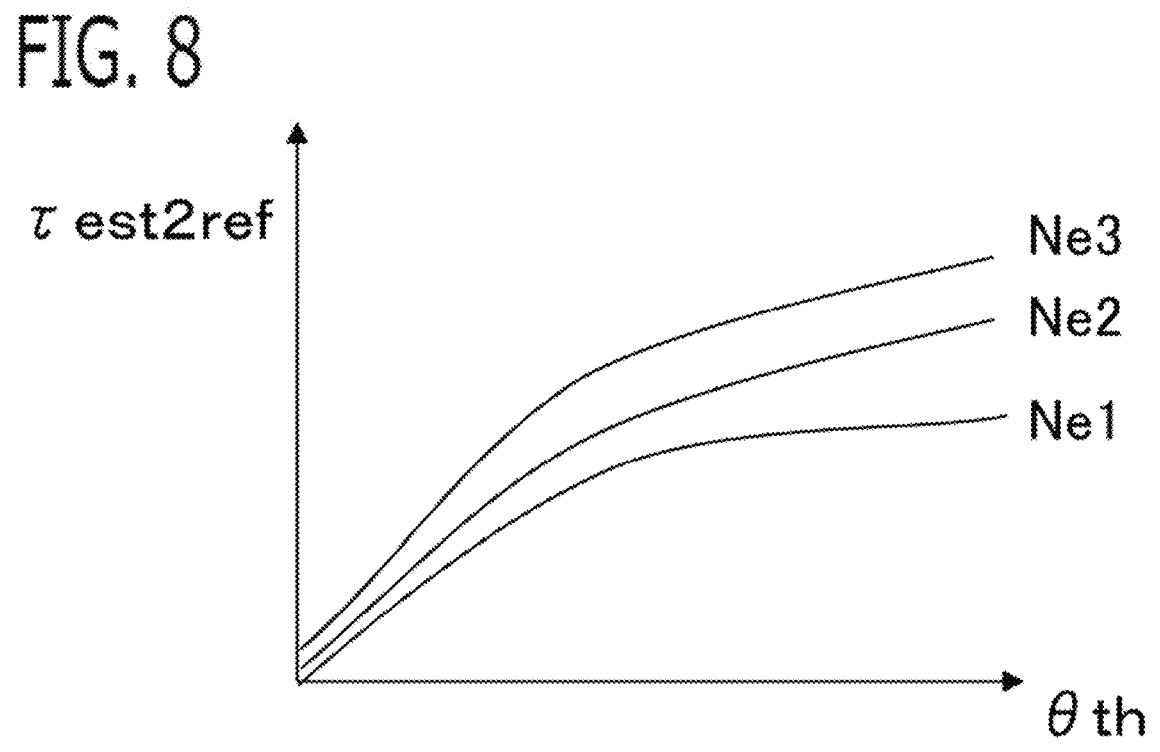

For example, a case where the throttle opening degree θth and the rotational speed Ne are used is explained as the operating state for reference value. As shown in FIG. 8, the torque characteristic data for reference value is a map data in which a relation between the throttle opening degree θth, the rotational speed Ne, and the reference value of second estimation torque τest2ref is preliminarily set. The reference value calculation unit 541 calculates the reference value of second estimation torque τest2ref corresponding to the present throttle opening degree θth and the present rotational speed Ne, by referring to the torque characteristic data for reference value. Herein, instead of the throttle opening degree θth, the cylinder internal intake air amount or the fuel injection amount may be used. That is, as the operating state for reference value, parameters correlated with the rotational speed Ne and the fuel injection amount may be used.

As the operating state for reference value, various operating states of internal combustion engine correlated with the output torque, for example, the EGR rate, the ignition timing, the opening and closing timing of the intake valve, and the opening and closing timing of the exhaust valve may be used. As the torque characteristic data for reference value, a plurality of map data may be combined, or a neural network and the like may be used.

<Learning Value Calculation Unit 542>

The learning value calculation unit 542 updates the error learning value Δτlrn based on the deviation Δτest2 between the second estimation torque τest2 and the reference value of second estimation torque τest2ref.

The learning value calculation unit 542 performs a statistical processing to the deviation Δτest2, and updates the error learning value Δτlrn. For example, a low pass filter processing is performed as the statistical processing. The learning value calculation unit 542 updates the error learning value Δτlrn using the next equation. Herein, (j) expresses a value calculated at the present update period, and (j−1) expresses a value calculated at the previous update period. Kflt is a filter gain. In the present embodiment, the update period is set to a period when the crankshaft rotates two times.

[Math. 5]

$$\Delta \tau_{est2}(j) = \tau_{est2ref}(j) - \tau_{est2}(j) \qquad (5)$$

$$\Delta \tau_{lrn}(j) = K_{flt} \times \Delta \tau_{est2}(j) + (1 - K_{flt}) \times \Delta \tau_{lrn}(j - 1)$$

The error learning value Δτlrn may be provided for every region of the operating state which includes at least one or more of the throttle opening degree θth, the cylinder internal intake air amount, the fuel injection amount, and the rotational speed Ne, and updated.

<Estimation Torque Correction Unit 543>

The estimation torque correction unit 543 calculates a value obtained by correcting the first estimation torque τest1 by the error learning value Δτlrn, as the third estimation torque τest3. For example, the estimation torque correction unit 543 calculates the third estimation torque τest3 using the next equation.

[Math. 6]

$$\tau_{est3} = \tau_{est1} + \Delta\tau_{lrn} \tag{6}$$

Alternatively, the estimation torque correction unit 543 may calculate a correction coefficient Kτ, based on an operating state for correction coefficient which includes at least one or more of the throttle opening degree θth, the cylinder internal intake air amount, the fuel injection amount, and the rotational speed Ne; and may calculate a value obtained by adding a multiplication value of the error learning value Δτlrn and the correction coefficient Kτ to the first estimation torque τest1, as third estimation torque τest3, as shown in the next equation.

[Math. 7]

$$\tau_{est3} = \tau_{est1} + K_\tau \times \Delta\tau_{lrn} \tag{7}$$

Since an influence degree of the error learning value Δτlrn on the estimation torque changes according to the operating state, the correction accuracy can be improved by multiplying the correction coefficient Kτ to the error learning value Δτlrn. A proportional coefficient of the average output torque during the stroke period with respect to the maximum value or the increase amount of the momentary torque increased by combustion changes according to the operating state. Accordingly, by calculating the correction coefficient Kτ based on the operating state for correction coefficient, and multiplying the correction coefficient Kτ to the error learning value Δτlrn, the correction accuracy can be improved.

By using a correction coefficient setting data for reference value in which a relation between the operating state for correction coefficient and the correction coefficient Kτ is preliminarily set, the estimation torque correction unit 543 calculates the correction coefficient Kτ corresponding to the present operating state for correction coefficient. The correction coefficient setting data is configured similarly to the torque characteristic data for reference value and the like.

2. Embodiment 2

The torque estimation apparatus 100 according to Embodiment 2 will be explained with reference to drawings. The explanation for constituent parts the same as those in Embodiment 1 will be omitted. The basic configuration of the torque estimation apparatus 100 according to the present embodiment is the same as that of Embodiment 1. Embodiment 2 is different from Embodiment 1 in a part of processing of the third estimation torque calculation unit 54.

Figure 9:
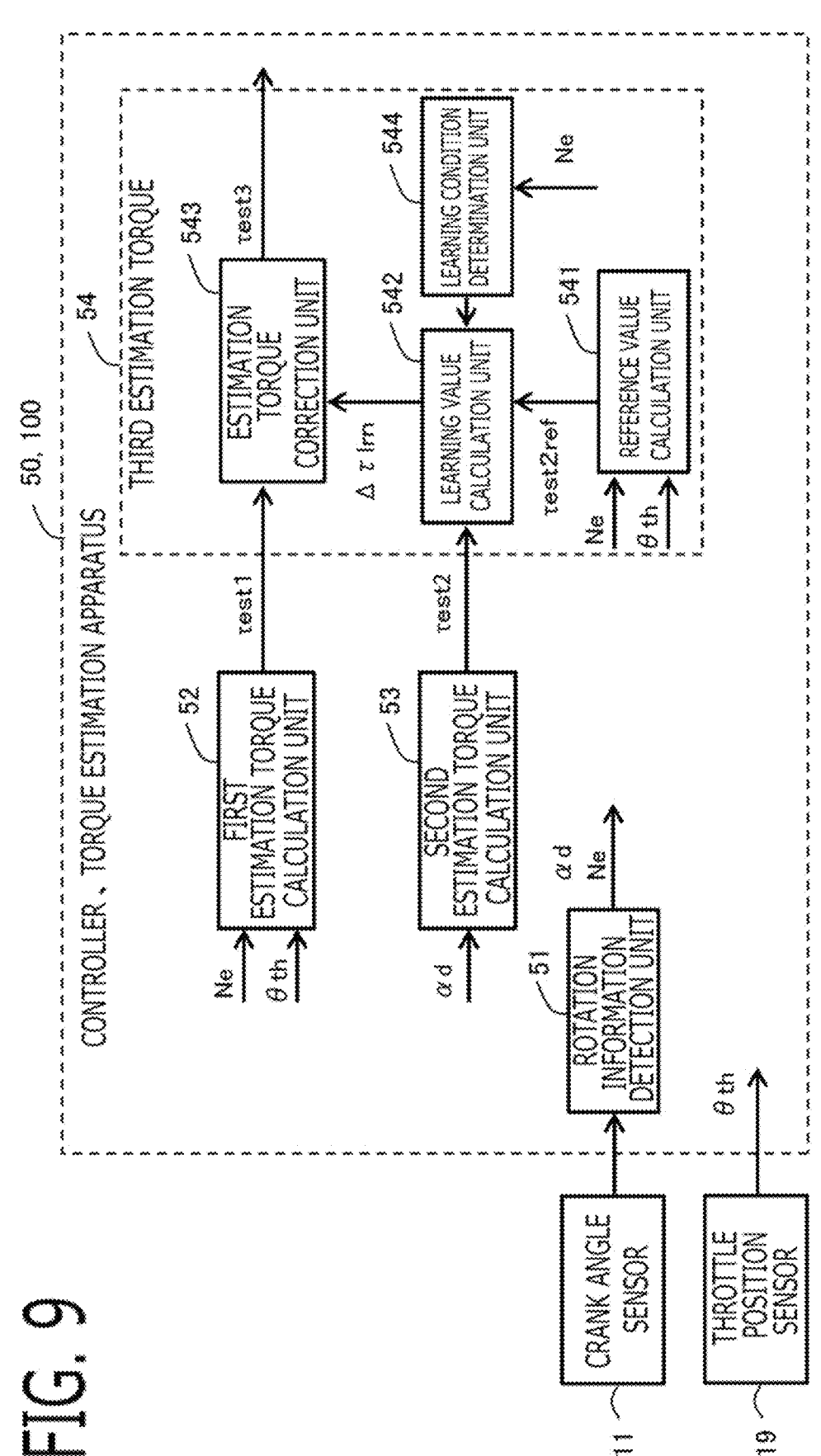
FIG. 9 is a block diagram of the torque estimation apparatus (controller) according to Embodiment 2.

In the present embodiment, as shown in FIG. 9, the third estimation torque calculation unit 54 is provided with a learning condition determination unit 544, in addition to the reference value calculation unit 541, the learning value calculation unit 542, and the estimation torque correction unit 543.

The learning condition determination unit 544 determines whether or not a learning condition is established based on an operating state for learning determination which includes at least one or more of the throttle opening degree θth, the cylinder internal intake air amount, the fuel injection amount, and the rotational speed Ne. The learning value calculation unit 542 updates the error learning value Δτlrn based on the deviation Δτest2, when the learning condition is established.

According to this configuration, the learning accuracy can be improved by learning when the preliminarily set learning condition is established.

Figure 10:
FIG. 10 is a time chart for explaining the error learning according to Embodiment 2.
Figure 11:
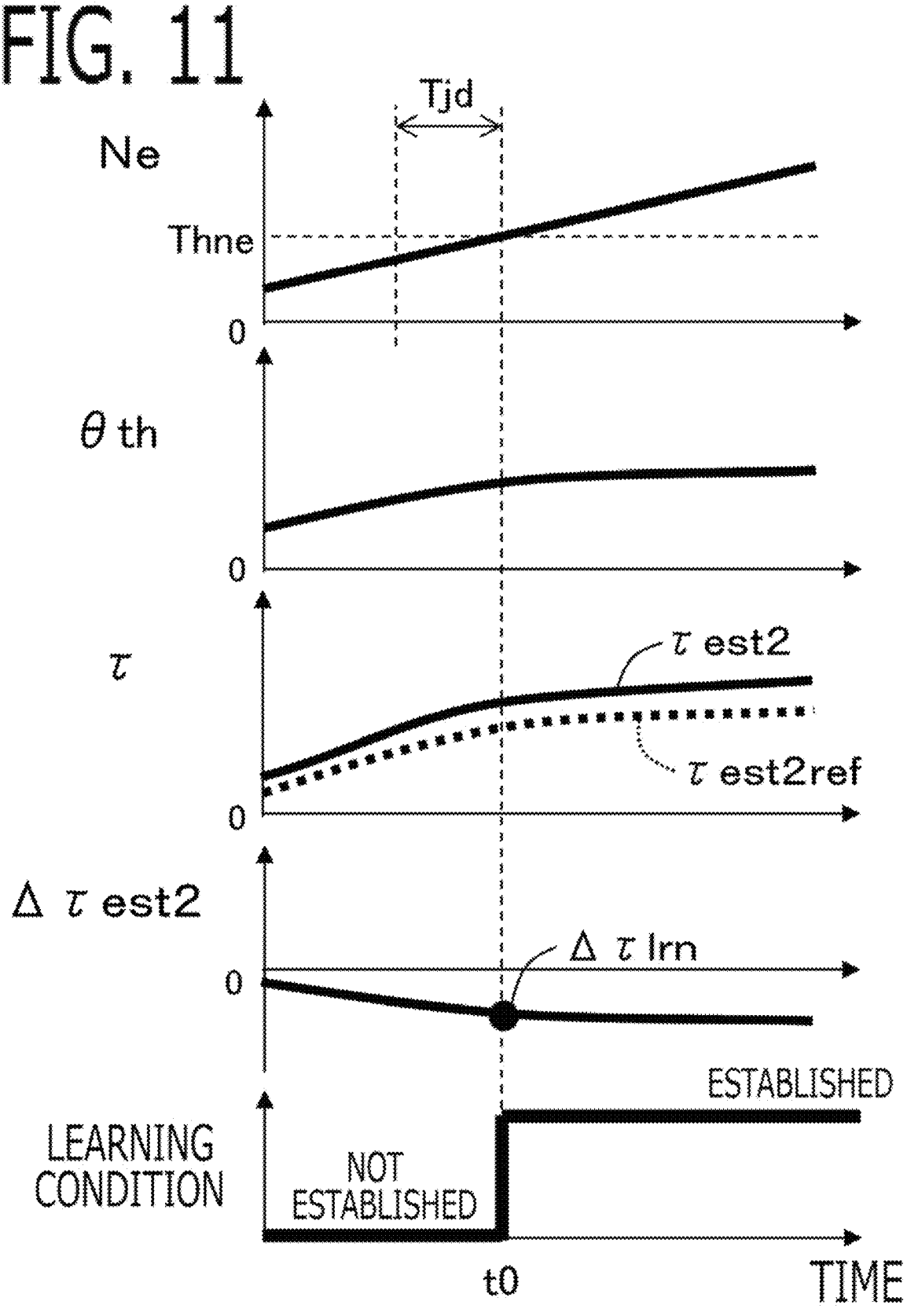
FIG. 11 is a time chart for explaining the error learning according to Embodiment 2.

In the present embodiment, as shown in FIG. 10 and FIG. 11, the learning condition determination unit 544 determines that the learning condition is established, when the rotational speed Ne passes a preliminarily set determination rotational speed Thne during the increase in the rotational speed Ne.

The state where acceleration and deceleration of the rotational speed Ne are performed is a transient state where the torque of the internal combustion engine is increasing or decreasing. Accordingly, if the learning is performed in this transient state, it easily causes a decrease in the learning accuracy. In the state where the rotational speed Ne is increasing continuously, the torque increases and decreases little and is stable. Accordingly, the learning accuracy can be improved. Especially, in the case of two wheel vehicles, the output of the internal combustion engine is small and the inertia is low compared with four wheel vehicles. Accordingly, the learning accuracy is reduced easily due to variation factors, but the decrease in the learning accuracy can be suppressed by the above configuration.

For example, the learning condition determination unit 544 determines that the learning condition is established, when the rotational speed Ne is increasing continuously during a determination period Tjd and the rotational speed Ne passes the determination rotational speed Thne.

By setting the determination period Tjd, the state where the torque increases and decreases little and is stable can be determined with better accuracy, and the learning accuracy can be improved.

Furthermore, the learning condition determination unit 544 may determine that the learning condition is established, when the rotational speed Ne is increasing continuously within a preliminarily set range of an increase rate during the determination period Tjd, and the rotational speed Ne passes the determination rotational speed Thne.

By setting the range of the increase rate of the rotational speed Ne, the state where the torque increases and decreases little and is stable can be determined with further better accuracy, and the learning accuracy can be improved.

The behavior at learning will be explained using FIG. 10 and FIG. 11. First, FIG. 10 will be explained. In FIG. 10, the internal combustion engine has no individual variation and no aging change, the second estimation torque τest2 coincides with the reference value of second estimation torque τest2ref, and the deviation Δτest2 is close to zero. The throttle opening degree θth increases, the torque increases, and the rotational speed Ne is increasing continuously. During the increase in the rotational speed Ne, at the time to, the rotational speed Ne passes the determination rotational speed Thne, and the learning condition is established. The deviation Δτest2 when the learning condition is established is learned as the error learning value Δτlrn.

Next, FIG. 11 will be explained. In FIG. 11, the internal combustion engine has the individual variation and the aging change, the second estimation torque τest2 exceeds the reference value of second estimation torque τest2ref, and the deviation Δτest2 is smaller than zero. The throttle opening degree θth increases, the torque increases, and the rotational speed Ne is increasing continuously. During the increase in the rotational speed Ne, at the time to, the rotational speed Ne passes the determination rotational speed Thne, and the learning condition is established. The deviation $\Delta\tau$test2 when the learning condition is established is learned as the error learning value $\Delta\tau$lrn.

An average value of the plurality of deviations $\Delta\tau$test2 when the learning condition is established plural times may be learned as the error learning value $\Delta\tau$lrn.

In each of above Embodiments, there has been explained the case where the four-cylinder internal combustion engine with four cylinders is used. However, the internal combustion engine with any number of cylinders (for example, one-cylinder, two-cylinder, three-cylinder, six-cylinder) may be used.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Internal Combustion Engine, 2: Crankshaft, 7: Combustion Chamber (Cylinder), 51: Rotation Information Detection Unit, 52: First Estimation Torque Calculation Unit, 53: Second Estimation Torque Calculation Unit, 54: Third Estimation Torque Calculation Unit, 100: Torque Estimation Apparatus, K$\tau$: Correction Coefficient, Ne: Rotational Speed, Thne: Determination Rotational Speed, Tjd: Determination Period, $\tau$est1: First Estimation Torque. $\tau$est2: Second Estimation Torque, $\tau$est2ref: Reference Value of Second Estimation Torque, $\tau$est3: Third Estimation Torque, $\Delta\tau$test2: Deviation, $\Delta\tau$lrn: Error Learning Value, $\alpha$d: Angular Acceleration, $\alpha$max: Maximum Value of Angular Acceleration, $\theta$th: Throttle Opening Degree

What is claimed is:

1. A torque estimation apparatus for an internal combustion engine comprising at least one processor configured to implement:

a rotation information detector that detects a rotational speed and an angular acceleration of a crankshaft of the internal combustion engine;

a first estimation torque calculator that, by using a torque characteristic data for first estimation torque in which a relation between an operating state for torque characteristic data which includes at least one or more of a throttle opening degree, a cylinder internal intake air amount, a fuel injection amount, and the rotational speed, and a first estimation torque as an output torque of the internal combustion engine is preliminarily set, calculates the first estimation torque corresponding to the present operating state for torque characteristic data;

a second estimation torque calculator that calculates a second estimation torque which is an estimated torque of the crankshaft, based on the angular acceleration; and a third estimation torque calculation calculator that learns a deviation between the second estimation torque and a preliminarily set reference value of second estimation torque, as an error learning value, and calculates a value obtained by correcting the first estimation torque with the error learning value, as a third estimation torque.

2. The torque estimation apparatus for the internal combustion engine according to claim 1, wherein a third estimation torque calculator determines whether or not a learning condition is established based on an operating state for learning determination which includes at least one or more of the throttle opening degree, the cylinder internal intake air amount, the fuel injection amount, and the rotational speed; and updates the error learning value based on the deviation, when determining that the learning condition is established.

3. The torque estimation apparatus for the internal combustion engine according to claim 1, wherein the third estimation torque calculator calculates a correction coefficient based on an operating state for correction coefficient which includes at least one or more of the throttle opening degree, the cylinder internal intake air amount, the fuel injection amount, and the rotational speed;

calculates a value obtained by correcting the first estimation torque with a multiplication value of the error learning value and the correction coefficient, as the third estimation torque.

4. The torque estimation apparatus for the internal combustion engine according to claim 1, wherein the second estimation torque calculator calculates a maximum value of the angular acceleration during a combustion stroke, and calculates the second estimation torque based on the maximum value.

5. The torque estimation apparatus for the internal combustion engine according to claim 1, wherein the internal combustion engine has a plurality of combustion chambers, and wherein the second estimation torque calculator calculates a maximum value of the angular acceleration during a combustion stroke, for each of the plurality of combustion chambers; and calculates the second estimation torque based on an average value of the maximum values of the plurality of combustion chambers.

6. The torque estimation apparatus for the internal combustion engine according to claim 1, wherein, by using a torque characteristic data for reference value in which a relation between an operating state for reference value which includes at least one or more of the throttle opening degree, the cylinder internal intake air amount, the fuel injection amount, and the rotational speed, and the reference value of second estimation torque is preliminarily set, the third estimation torque calculator calculates the reference value of second estimation torque corresponding to the present operating state for reference value.

7. The torque estimation apparatus for the internal combustion engine according to claim 1, wherein the third estimation torque calculator determines that a learning condition is established, when the rotational speed passes a preliminarily set determination rotational speed during an increase in the rotational speed, and updates the error learning value based on the deviation.

8. The torque estimation apparatus for the internal combustion engine according to claim 7, wherein the third estimation torque calculator determines that the learning condition is established, when the rotational speed is increasing continuously during a determination period and the rotational speed passes the determination rotational speed.

\* \* \* \* \*